US012754415B2

(12) United States Patent
Sugisaka et al.

(10) Patent No.: US 12,754,415 B2
(45) Date of Patent: Oct. 6, 2026

(54) VEHICLE CAMERA SYSTEM

(71) Applicant: KABUSHIKI KAISHA TOKAI-RIKA-DENKI-SEISAKUSHO, Aichi (JP)

(72) Inventors: Kenichi Sugisaka, Aichi (JP); Suguru Fujisaki, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 584 days.

(21) Appl. No.: 17/911,334

(22) PCT Filed: Feb. 2, 2021

(86) PCT No.: PCT/JP2021/003759
§ 371 (c)(1),
(2) Date: Sep. 13, 2022

(87) PCT Pub. No.: WO2021/186923
PCT Pub. Date: Sep. 23, 2021

(65) Prior Publication Data

US 2023/0130475 A1 Apr. 27, 2023

(30) Foreign Application Priority Data

Mar. 19, 2020 (JP) ................................ 2020-050326

(51) Int. Cl.
*G02B 27/00* (2006.01)
*H04N 23/00* (2023.01)
*H05B 3/22* (2006.01)

(52) U.S. Cl.
CPC ......... *G02B 27/0006* (2013.01); *H04N 23/00* (2023.01); *H05B 3/22* (2013.01)

(58) Field of Classification Search
CPC G02B 27/0006; G02B 1/18; H05B 2203/011; H05B 2203/013; H05B 2203/02; G03B 17/55
See application file for complete search history.

(56) References Cited

U.S. PATENT DOCUMENTS

2003/0214733 A1 11/2003 Fujikawa et al.
2006/0108352 A1 5/2006 Fernandez
(Continued)

FOREIGN PATENT DOCUMENTS

JP H05-053077 3/1993
JP 2003-267140 9/2003
(Continued)

OTHER PUBLICATIONS

Kaji, English translation for WO-2020004351-A1 (Year: 2020).*
(Continued)

*Primary Examiner* — Jonathan Y Jung
(74) *Attorney, Agent, or Firm* — Dority & Manning, PA

(57) ABSTRACT

In a vehicle camera system, a camera captures an image through a predetermined area of a transmissive member. In the transmissive member, a current between a pair of electrode films is supplied to a transparent conductive film and causes the transparent conductive film to generate heat, thereby heating the transmissive member. The transparent conductive film is disposed in the predetermined area of the transmissive member. With this configuration, it is possible to heat the predetermined area of the transmissive member promptly.

11 Claims, 6 Drawing Sheets

(56) References Cited

U.S. PATENT DOCUMENTS

| | | | | |
|---|---|---|---|---|
| 2019/0193079 A1* | 6/2019 | Ching | ...................... | G01N 1/44 |
| 2020/0137277 A1* | 4/2020 | Ichimura | ................ | G03B 17/55 |
| 2020/0275533 A1* | 8/2020 | Ochiai | ................... | G03B 17/55 |
| 2021/0001695 A1* | 1/2021 | Ogawa | ..................... | H05B 3/84 |
| 2021/0235551 A1* | 7/2021 | Watanabe | ................ | H05B 3/20 |
| 2021/0263305 A1* | 8/2021 | Kasetani | .................. | H05B 3/84 |
| 2021/0294066 A1* | 9/2021 | Hirata | .................... | G02B 7/028 |

FOREIGN PATENT DOCUMENTS

| | | | |
|---|---|---|---|
| JP | 2003-327048 | 11/2003 | |
| JP | 2006-525897 | 11/2006 | |
| JP | 2009-100174 | 5/2009 | |
| JP | 2018-116121 | 7/2018 | |
| WO | WO2019/225745 | 11/2019 | |
| WO | WO-2020004351 A1 * | 1/2020 | ................ B60S 1/60 |

OTHER PUBLICATIONS

PCT International Search Report and Written Opinion (w/ English translation) for corresponding PCT Application No. PCT/JP2021/003759, mailed on Apr. 27, 2021, 13 pages.

* cited by examiner

VEHICLE CAMERA SYSTEM

CROSS-REFERENCE TO RELATED APPLICATIONS

The present application is related and has right of priority to JP 2020-050326, which was filed on Mar. 19, 2020 in the Japanese Patent Office, and is a U.S. national phase entry of PCT/JP2021/003759, which was filed on Feb. 2, 2021, both of which are incorporated by reference in their entireties for all purposes.

TECHNICAL FIELD

This invention relates to a vehicle camera system including a camera mechanism that captures an image of a front side of a transmissive member through a predetermined area of the transmissive member.

BACKGROUND ART

Japanese Patent Application Laid-Open (JP-A) No. 2018-116121 discloses an image pickup device in which a camera captures an image of a front side of a cover glass through the cover glass. The entire surface of the cover glass is provided with a transparent conductive film, and a metal layer and a heating element are also disposed on the cover glass outside an area within angle of view of the camera. Heat generated by the heating element is transmitted to the transparent conductive film through the metal layer, thereby heating the area in the cover glass within angle of view of the camera.

In such an image pickup device, it is preferable to promptly heat an area in a cover glass within angle of view of a camera.

SUMMARY OF INVENTION

Technical Problem

The present invention has been made in view of the circumstances, and an object of the invention is to obtain a vehicle camera system capable of promptly heating a predetermined area of a transmissive member.

Solution to Problem

A first aspect of the present invention provides a vehicle camera system including: a camera mechanism provided with a transmissive member that transmits light, the camera mechanism being configured to capture an image of a front side of the transmissive member through a predetermined area of the transmissive member; a heat generator disposed in the predetermined area of the transmissive member, the heat generator being configured to generate heat by supply of a current; a resistor electrically connected to the heat generator; and an electrode unit electrically connected to the resistor, the electrode unit being configured to supply a current to the heat generator through the resistor.

A second aspect of the invention provides the vehicle camera system according to the first aspect of the invention in which the resistor has a resistance that changes according to temperature change of the resistor.

A third aspect of the invention provides the vehicle camera system according to the first aspect or the second aspect of the invention in which the heat generator and the electrode unit have a constant separation distance.

A fourth aspect of the invention provides the vehicle camera system according to the first aspect or the second aspect of the invention in which the heat generator and the electrode unit have a varying separation distance.

A fifth aspect of the invention provides the vehicle camera system according to any one of the first to fourth aspects of the invention including a cover configured to cover at least one of the heat generator, the resistor, or the electrode unit.

A sixth aspect of the invention provides the vehicle camera system according to the fifth aspect of the invention in which the cover is disposed in an area other than the predetermined area of the transmissive member.

A seventh aspect of the invention provides the vehicle camera system according to any one of the first to sixth aspects of the invention further including a communication portion configured to allow a hollow portion in the transmissive member to communicate with an outside of the transmissive member.

An eighth aspect of the invention provides the vehicle camera system according to any one of the first to seventh aspects of the invention including a restriction unit configured to restrict deformation of at least one of the heat generator, the resistor, or the electrode unit.

Advantageous Effects of Invention

According to the first aspect of the invention, in the vehicle camera system, the camera mechanism captures an image of the front side of the transmissive member through the predetermined area of the transmissive member. In addition, the resistor is electrically connected to the heat generator of the transmissive member, and the electrode unit is electrically connected to the resistor. The electrode unit supplies a current to the heat generator through the resistor and causes the heat generator to generate heat, thereby heating the transmissive member.

The heat generator is disposed in the predetermined area of the transmissive member. With this configuration, it is possible to heat the predetermined area of the transmissive member promptly.

According to the second aspect of the invention, in the vehicle camera system, the resistor has the resistance that changes according to temperature change of the resistor. This makes it possible to adjust conditions of heat generation in the heat generator by the temperature of the resistor.

According to the third aspect of the invention, in the vehicle camera system, the heat generator and the electrode unit have a constant separation distance. Accordingly, a current-passing distance in the resistor between the heat generator and the electrode unit becomes constant, which makes it possible to adjust conditions of heat generation in the heat generator.

According to the fourth aspect of the invention, in the vehicle camera system, the heat generator and the electrode unit have a varying separation distance. Accordingly, a current-passing distance in the resistor between the heat generator and the electrode unit changes, which makes it possible to adjust conditions of heat generation in the heat generator.

According to the fifth aspect of the invention, in the vehicle camera system, the cover is configured to cover at least one of the heat generator, the resistor, or the electrode unit. Such a configuration makes it possible to protect at least one of the heat generator, the resistor, or the electrode unit.

According to the sixth aspect of the invention, in the vehicle camera system, the cover is disposed in an area other than the predetermined area of the transmissive member. This makes it possible to suppress deterioration of light transmission performance in the predetermined area of the transmissive member.

According to the seventh aspect of the invention, in the vehicle camera system, the communication portion allows the hollow portion in the transmissive member to communicate with the outside of the transmissive member. This makes it possible to prevent the air from remaining in the hollow portion in the transmissive member.

According to the eighth aspect of the invention, in the vehicle camera system, the restriction unit is configured to restrict deformation of at least one of the heat generator, the resistor, or the electrode unit. Such a configuration makes it possible to protect at least one of the heat generator, the resistor, or the electrode unit.

DESCRIPTION OF EMBODIMENTS

First Embodiment

Figure 1:
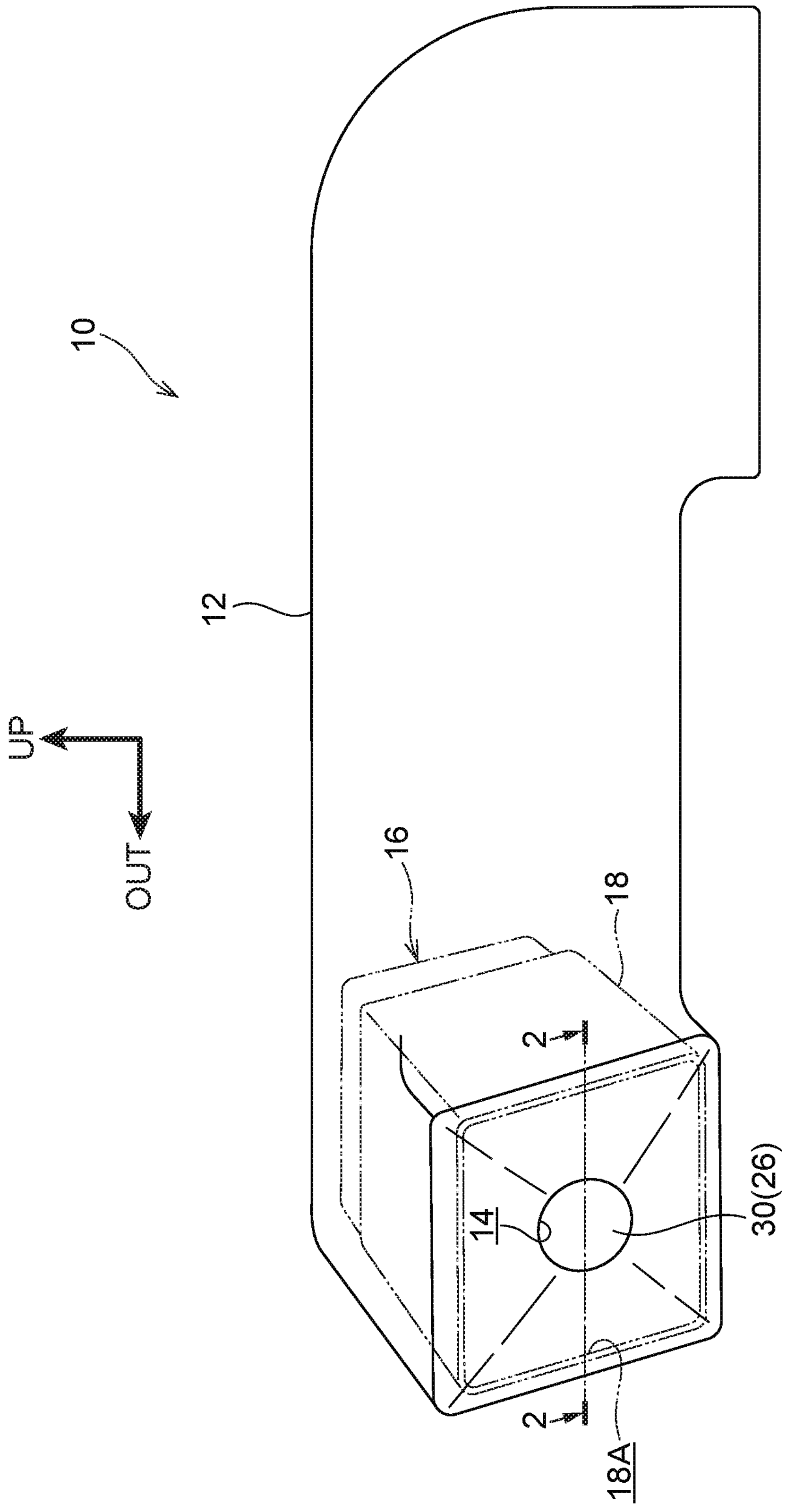
FIG. 1 is a front view of a vehicle camera system according to a first embodiment of the invention viewed from the vehicle rear side.
Figure 2:
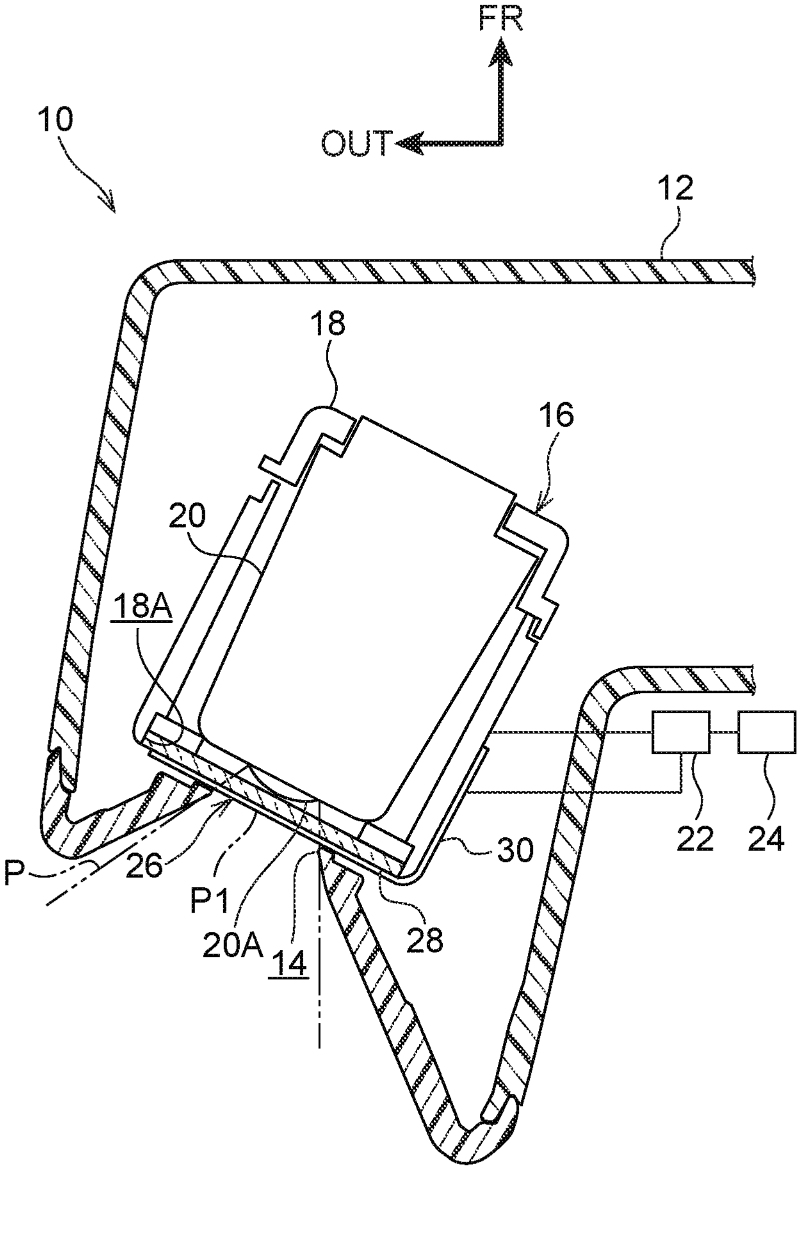
FIG. 2 is a cross-sectional view (cross-sectional view taken along line 2-2 in FIG. 1) of the vehicle camera system according to the first embodiment of the invention viewed from above.

FIG. 1 is a front view of a vehicle camera system 10 according to a first embodiment of the invention viewed from the vehicle rear side. FIG. 2 is a cross-sectional view of the vehicle camera system 10 viewed from above (cross-sectional view taken along line 2-2 in FIG. 1). In the drawings, the front of a vehicle is indicated by arrow FR, the outside of the vehicle in a vehicle width direction (the left side of the vehicle) is indicated by arrow OUT, and the upper side of the vehicle is indicated by arrow UP.

The vehicle camera system 10 according to this embodiment is disposed in an end on the vehicle front side of a vertically intermediate portion of a side door (particularly, a front side door) serving as a body of a vehicle (automobile) and is disposed on the outer side of the vehicle.

As illustrated in FIGS. 1 and 2, the vehicle camera system 10 is provided with a housing 12 serving as a container having a substantially cuboid box shape. The housing 12 extends outward in the vehicle width direction from the side door. A support (not shown) is disposed in the housing 12. The support extends in the vehicle width direction. An inner end of the support in the vehicle width direction protrudes downward from an inner end of the housing 12 in the vehicle width direction, and the inner end of the support in the vehicle width direction is supported by the side door. The support supports the housing 12, and the housing 12 is supported by the side door via the support. The housing 12 has an outer end in the vehicle width direction protruding to the vehicle rear side, and the outer end of the housing 12 in the vehicle width direction includes a wall on the vehicle rear side having a substantially central portion penetrated by a circular exposure hole 14.

A camera mechanism 16 is provided within the outer end of the housing 12 in the vehicle width direction.

The camera mechanism 16 is provided with a bracket 18 having a substantially cuboid box shape. The bracket 18 is supported by the support, and the camera mechanism 16 is supported by the support. The bracket 18 has an end on the vehicle rear side provided with a rectangular opening 18A, and the bracket 18 is open on the vehicle rear side through the opening 18A.

The bracket 18 houses a substantially cuboid camera 20, and the camera 20 is fixed to the bracket 18. The camera 20 includes a lens 20A serving as a transmission unit at the center of an end on the vehicle rear side. The lens 20A has a vehicle rear surface (front surface) exposed on the vehicle rear side, and the lens 20A is transparent and transmits light. The camera 20 is electrically connected to a control device 22 of the vehicle, and the camera 20 is controlled by the control device 22 to capture a pickup area P (see FIG. 2) on the vehicle rear side through the exposure hole 14 of the housing 12 and the lens 20A. The pickup area P has a substantially conical shape concentric with a central axis of the lens 20A. A display device 24 is electrically connected to the control device 22, and the display device 24 is disposed in the interior of the vehicle.

Figure 3:
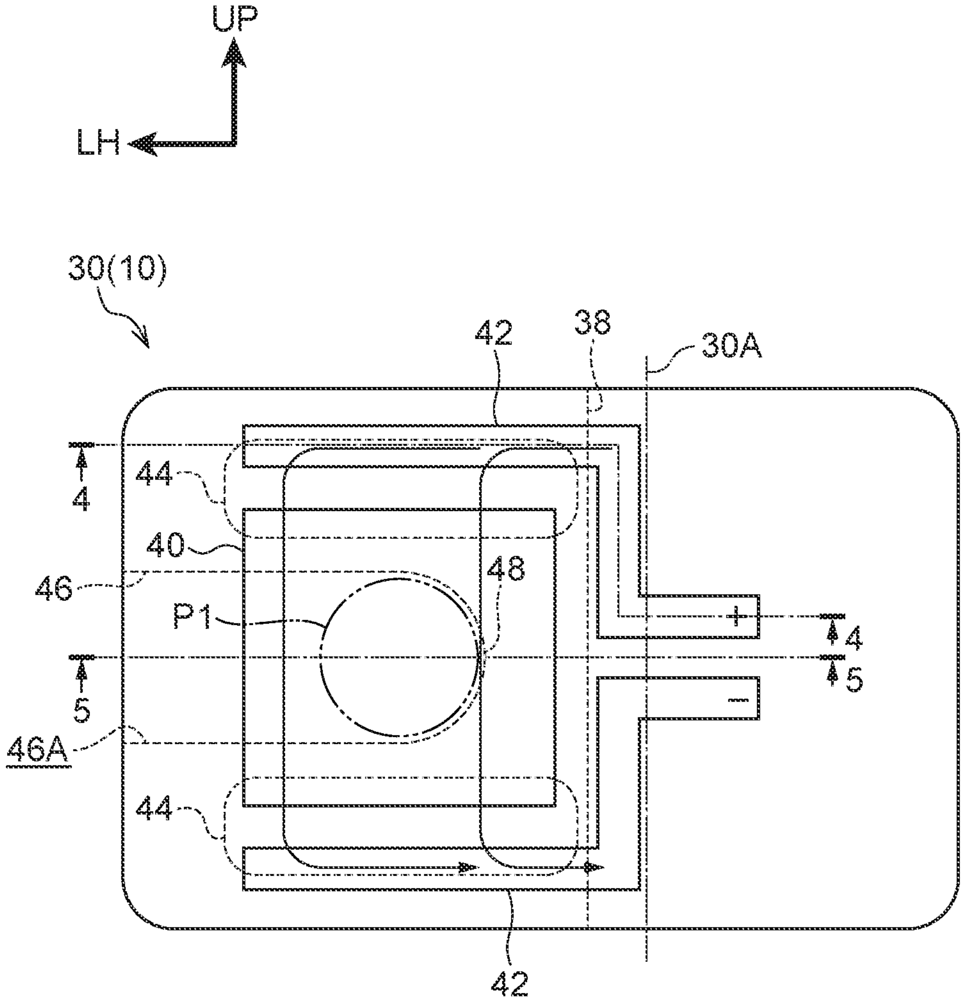
FIG. 3 is a developed front view of a heating sheet in the vehicle camera system according to the first embodiment of the invention.
Figure 4:
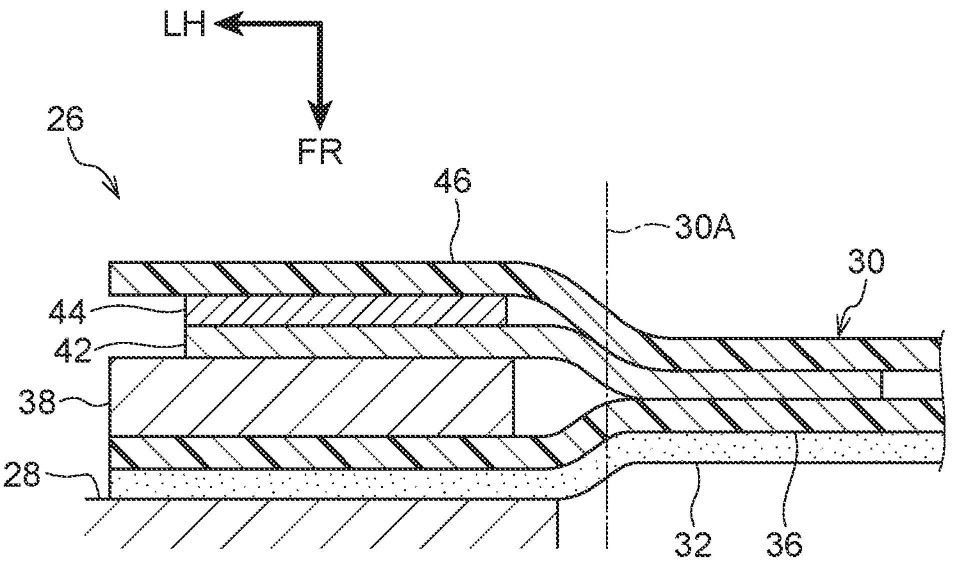
FIG. 4 is a cross-sectional view (cross-sectional view taken along line 4-4 in FIG. 3) of the heating sheet in the vehicle camera system according to the first embodiment of the invention viewed from below.
Figure 5A:
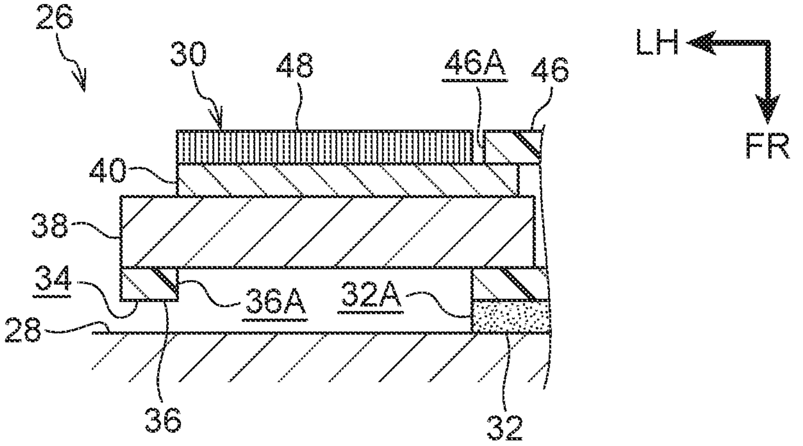
FIG. 5A is a cross-sectional view (cross-sectional view taken along line 5-5 in FIG. 3) of the heating sheet in the vehicle camera system according to the first embodiment of the invention viewed from below.

The camera mechanism 16 is provided with a rectangular transmissive member 26 (See FIGS. 3, 4, and 5A).

The transmissive member 26 is provided with a rectangular plate-like glass 28 serving as a base material. The glass 28 is transparent and transmits light. The glass 28 is fitted in and fixed to the opening 18A of the bracket 18. The glass 28 is opposed to the lens 20A of the camera 20.

The transmissive member 26 is provided with a rectangular heating sheet 30 serving as a heating member. A left-hand part (outer part in the vehicle width direction, or a part on the side indicated by arrow LH in FIG. 3) of the heating sheet 30 is disposed on the front side (vehicle rear side) of the glass 28, and the camera 20 captures an image on the vehicle rear side through a predetermined area P1 (a part of the pickup area P) having a truncated cone shape in the glass 28 and the left-hand part of the heating sheet 30. The heating sheet 30 is curved having a boundary 30A between the left-hand part and a right-hand part (inner part in the vehicle width direction) as a center line of the curve, and the right-hand part of the heating sheet 30 is located inside the bracket 18 in the vehicle width direction.

The back side of the heating sheet 30 is provided with a substantially rectangular layered adhesive layer 32 serving as a cover (adhesion unit). The adhesive layer 32 has insulating performance and is transparent and transmits light. The adhesive layer 32 adheres the left-hand part of the heating sheet 30 to the front side of the glass 28 and the vehicle rear side of an inner wall of the bracket 18 in the vehicle width direction, and the adhesive layer 32 adheres the right-hand part of the heating sheet 30 to the inner side of the bracket 18 in the vehicle width direction. A center side of a left-hand part of the adhesive layer 32 is penetrated by a circular adhesion hole 32A as a hollow portion, and the outer periphery of the adhesion hole 32A is located outside the predetermined area P1. The outer periphery of the left-hand part of the adhesive layer 32 is penetrated by a rectangular communication hole 34 as a communication portion, and the communication hole 34 allows the adhesion hole 32A to communicate with the outside of the adhesive layer 32.

The front side of the adhesive layer 32 is provided with a substantially rectangular film-shaped first film 36 serving as a cover. The first film 36 has insulating performance and is transparent and transmits light. A center side of a left-hand part of the first film 36 is penetrated by a circular first cover hole 36A as a hollow portion, and the outer periphery of the first cover hole 36A is located outside the predetermined area P1 and the first cover hole 36A communicates with the adhesion hole 32A of the adhesive layer 32.

The left-hand part of the first film 36 has the front side (vehicle rear side) provided with a rectangular film-shaped hard film 38 serving as a cover and a restriction unit. The hard film 38 has insulating performance and is transparent and transmits light. The hard film 38 is disposed entirely in the vertical direction and substantially entirely in the horizontal direction in the left-hand part of the heating sheet 30.

A center side of the front side (vehicle rear side) of the hard film 38 is provided with a rectangular transparent conductive film 40 serving as a heat generator, and the outer periphery of the transparent conductive film 40 is located outside the predetermined area P1. The transparent conductive film 40 includes, for example, indium tin oxide (ITO) as a material. The transparent conductive film 40 has conductivity and is transparent and transmits light.

An upper portion and a lower portion on the front side of the hard film 38 are provided with a long filmy electrode film 42 serving as an electrode mit. A material of each electrode film 42 is similar to that of the transparent conductive film 40. Heads of the upper and lower electrode films 42 extend in the horizontal direction on the upper side and the lower side of the transparent conductive film 40, respectively. A separation distance (vertical distance) between the head of the upper electrode film 42 and the transparent conductive film 40 and a separation distance (vertical distance) between the lower electrode film 42 and the transparent conductive film 40 are constant and equal in the entire horizontal direction. The upper electrode film 42 has an intermediate portion extending downward from the right side of the head and has a tail extending rightward from a lower end of the intermediate portion. The lower electrode film 42 has an intermediate portion extending upward from the right side of the head and has a tail extending rightward from an upper end of the intermediate portion. The intermediate portions of the electrode films 42 are disposed on the right side of the hard film 38, and the tails of the electrode films 42 extend to the right-hand part of the heating sheet 30. The back side of the intermediate portion and the tail of each electrode film 42 are covered with the first film 36. The control device 22 is electrically connected to the tails of the pair of electrode films 42, and a current is supplied between the tails of the pair of electrode films 42 under control of the control device 22.

The upper portion and the lower portion on the front side of the hard film 38 are provided with what is called a positive temperature coefficient (PTC) layer 44 serving as a resistor (temperature adjuster) having a long layered shape. Each PTC layer 44 is stretched in the horizontal direction and located outside the predetermined area P. The upper PTC layer 44 electrically connects the front side of the head of the upper electrode film 42 and the front side of an upper end of the transparent conductive film 40. The lower PTC layer 44 electrically connects the front side of the head of the lower electrode film 42 and the front side of a lower end of the transparent conductive film 40. The PTC layers 44 are larger in resistance than the electrode films 42. An increase in temperature of the PTC layers 44 increases resistance in the PTC layers 44.

The front side of the heating sheet 30 is provided with a substantially rectangular film-shaped second film 46 serving as a cover. The second film 46 has insulating performance and is transparent and transmits light. A substantially semi-elliptical second cover hole 46A serving as an opening penetrates an intermediate portion in the vertical direction in a left-hand part of the second film 46, and the outer periphery of the second cover hole 46A is located outside the predetermined area P1 and the second cover hole 46A is open on the left side. The second film 46 covers the front side of the first film 36, the hard film 38, the transparent conductive film 40, each electrode film 42, and each PTC layer 44, and a part of the transparent conductive film 40 excluding right, upper, and lower portions of the second cover hole 46A is open on the front side.

The front side (vehicle rear side) of the transparent conductive film 40 is provided with a hydrophilic film 48 having a substantially semi-elliptical film shape serving as a suppression unit. The hydrophilic film 48 is disposed inside the second cover hole 46A of the second film 46 and has the outer periphery located outside the predetermined area P1. The hydrophilic film 48 is formed by, for example, stacking a hydrophilic layer on the front side (for example, a $SiO_2$ layer) and a photocatalyst layer on the back side (for example, a $TiO_2$ layer). The hydrophilic film 48 has insulating performance and is transparent and transmits light. The hydrophilic film 48 has hydrophilicity, and the hydrophilic film 48 suppresses contamination of the front side of the transparent conductive film 40.

The hard film 38 is higher in hardness (rigidity) than the adhesive layer 32, the first film 36, the transparent conductive film 40, the electrode films 42, the PTC layers 44, the second film 46, and the hydrophilic film 48.

Next, functions of this embodiment will be described.

In the vehicle camera system 10 having the above configuration, the camera 20 in the camera mechanism 16 is controlled by the control device 22 to capture an image of the vehicle rear side of the transmissive member 26 through the exposure hole 14 of the housing 12, the predetermined area P1 of the transmissive member 26, and the lens 20A of the camera 20. The display device 24 is also controlled by the control device 22 to show the image captured by the camera 20. Accordingly, viewing the image shown by the display device 24 helps an occupant (particularly, a driver) of a vehicle with visibility on the vehicle rear side of the occupant.

Furthermore, in the transmissive member 26, the heating sheet 30 is disposed on the front side (vehicle rear side) of the glass 28, and in the heating sheet 30, a current controlled by the control device 22 is supplied between the tails of the pair of electrode films 42 and passes in the vertical direction through the transparent conductive film 40 and the pair of PTC layers 44 between the heads of the pair of electrode films 42. Accordingly, the current supplied to the transparent conductive film 40 causes the transparent conductive film 40 to generate heat, thereby heating and removing rain, dew, frost, or the like on the front side of the transmissive member 26.

The transparent conductive film 40 is disposed in the predetermined area P1 of the transmissive member 26. With this configuration, the predetermined area P1 of the transmissive member 26 is directly heated by the transparent conductive film 40, which makes it possible to promptly heat the predetermined area P1 of the transmissive member 26 and makes it possible to promptly remove rain, dew, frost, or the like on the front side of the predetermined area P1 of the transmissive member 26, whereby the image captured by the camera 20 is improved promptly.

In addition, a rise in temperature of the PTC layers 44 increases resistance in the PTC layers 44. For this reason, when it takes a long time to pass a current to the PTC layers 44 (supply duration of a current to the transparent conductive film 40), heat generated in the PTC layers 44 raises the temperature of the PTC layers 44 and increases the resistance of the PTC layers 44, which reduces the current passing through the PTC layers 44 and reduces the current supplied to the transparent conductive film 40. Accordingly, the heat generation of the transparent conductive film 40 is suppressed, heating of the transmissive member 26 by the transparent conductive film 40 is suppressed, the transmissive member 26 is prevented from being heated to an excessively high temperature, and the heating temperature of the transmissive member 26 is adjusted.

Furthermore, the separation distances between the heads of the electrode films 42 and the transparent conductive film 40 are constant in the entire horizontal direction, and current-passing distances in the PTC layers 44 between the heads of the electrode films 42 and the transparent conductive film 40 are constant in the entire horizontal direction. For this reason, at the beginning of passage of a current to the PTC layers 44 (supply of a current to the transparent conductive film 40) (when the temperature of the PTC layers 44 is constant in the entire horizontal direction), the resistance in the PTC layers 44 is constant in the entire horizontal direction. Moreover, a distance from the tail to the head of each electrode film 42 increases toward the left side of the head of each electrode film 42 (outer side in the vehicle width direction), and the resistance from the tail of each electrode film 42 increases toward the left side of the head of each electrode film 42. For this reason, at the beginning of passage of a current to the PTC layers 44 (supply of a current to the transparent conductive film 40) (when the resistance of the PTC layers 44 is constant in the entire horizontal direction), the current passing between the heads of the pair of electrode films 42 decreases toward the left side of the heads of the electrode films 42 and increases toward the right side of the heads of the electrode films 42 (inner side in the vehicle width direction), and the current passing through the PTC layers 44 decreases toward the left side of the PTC layers 44 and increases toward the right side of the PTC layers 44.

Accordingly, with the lapse of time from the beginning of the passage of a current to the PTC layers 44 (the beginning of the supply of a current to the transparent conductive film 40), a rise in temperature due to the heat generated in the PTC layers 44 is smaller toward the left side of the PTC layers 44 and is larger toward the right side of the PTC layers 44, and the resistance of the PTC layers 44 is lower toward the left side of the PTC layers 44 and is higher toward the right side of the PTC layers 44. With such a configuration, the current passing between the heads of the pair of electrode films 42 is uniformed in the horizontal direction, the current supplied to the transparent conductive film 40 is uniformed in the horizontal direction, the heating temperature of the transmissive member 26 by the transparent conductive film 40 is uniformed in the horizontal direction, and the performance of removing rain, dew, frost, or the like on the front side of the transmissive member 26 by the transparent conductive film 40 is uniformed in the horizontal direction.

Still further, the heating sheet 30 is provided with the PTC layers 44 for adjusting the temperature of the transparent conductive film 40. Such a configuration eliminates the need to prepare an adjustment mechanism in addition to the heating sheet 30 for adjusting the temperature of the transparent conductive film 40, the need to separately prepare a space for the adjustment mechanism in a vehicle, and the need to assemble the adjustment mechanism to a vehicle. Furthermore, it is possible to remove design constraint on a vehicle attributed to the adjustment mechanism and it is possible to reduce costs.

In the heating sheet 30, the back side of the transparent conductive film 40, the electrode films 42, and the PTC layers 44 is covered with the adhesive layer 32, the first film 36, and the hard film 38, and the front side of the transparent conductive film 40, the electrode films 42, and the PTC layers 44 is covered with the second film 46. This makes it possible to protect the transparent conductive film 40, the electrode films 42, and the PTC layers 44.

Still further, in the heating sheet 30, the hard film 38 is disposed on the back side of the transparent conductive film 40, the electrode films 42, and the PTC layers 44, and the hard film 38 restricts deformation of the transparent conductive film 40, the electrode films 42, and the PTC layers 44. For this reason, for example, when the heating sheet 30 is adhered to the glass 28 and the bracket 18, it is possible to limit bending of the transparent conductive film 40, the electrode films 42, and the PTC layers 44, which limits damages to the transparent conductive film 40, the electrode films 42, and the PTC layers 44. In addition, it is possible to limit flexure of the PTC layers 44, which limits a change in resistance of the PTC layers 44.

In the heating sheet 30, the outer periphery of the adhesion hole 32A of the adhesive layer 32, the outer periphery of the first cover hole 36A of the first film 36, and the outer periphery of the second cover hole 46A of the second film 46 are located outside the predetermined area P1, and the adhesive layer 32, the first film 36, and the second film 46 are disposed in an area other than the predetermined area P1. With this configuration, particularly, even when at least one of the adhesive layer 32, the first film 36, or the second film 46 is deteriorated and discolored by ultraviolet rays, heat, water, or the like, it is possible to suppress deterioration of light transmission performance in the predetermined area P1 of the heating sheet 30, and it is possible to suppress deterioration in quality of an image captured by the camera 20.

Still further, the adhesion hole 32A of the adhesive layer 32 and the first cover hole 36A of the first film 36 in the transmissive member 26 communicate with the outside of the transmissive member 26 through the communication hole 34 of the adhesive layer 32. With this configuration, it is possible to discharge the air inside the adhesion hole 32A and the first cover hole 36A to the outside of the transmissive member 26 by the communication hole 34, and it is possible to prevent the air from remaining inside the adhesion hole 32A and the first cover hole 36A. For example, the air inside the adhesion hole 32A and the first cover hole 36A is prevented from thermally expanding to deform the heating sheet 30, which prevents the adhesion hole 32A and the first cover hole 36A from deteriorating the quality of the image captured by the camera 20.

Second Embodiment

Figure 6:
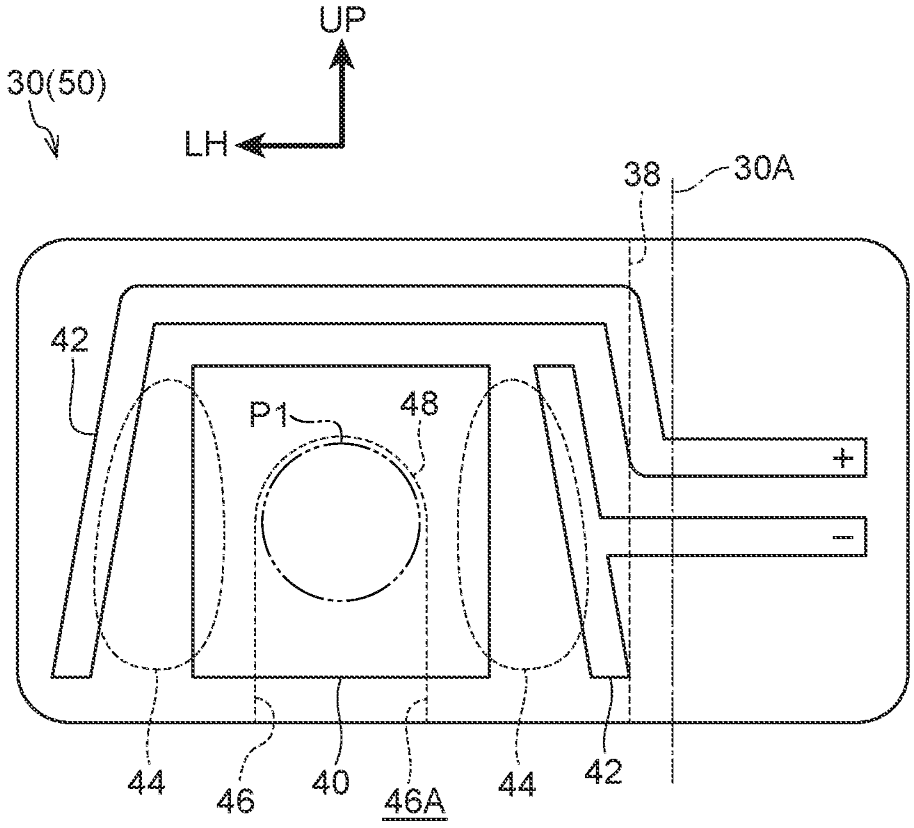
FIG. 6 is a developed front view of a heating sheet in a vehicle camera system according to a second embodiment of the invention.

FIG. 6 is a developed front view of a heating sheet 30 in a vehicle camera system 50 according to a second embodiment of the invention.

The vehicle camera system 50 according to this embodiment has a configuration substantially similar to that of the first embodiment but differs in the following points.

As shown in FIG. 6, in the heating sheet 30 of the vehicle camera system 50 according to this embodiment, heads of a pair of electrode films 42 are disposed on the left side (outer side in a vehicle width direction) and the right side (inner side in the vehicle width direction) of a transparent conductive film 40. The head of the left electrode film 42 is extended leftward toward the lower side, and the head of the right electrode film 42 is extended rightward toward the lower side. Separation distances (horizontal distances) between the heads of the left and right electrode films 42 and the transparent conductive film 40 are made longer toward the lower side and equal al the same position in the vertical direction. The left electrode film 42 has an intermediate portion extending rightward from an upper end of the head, and a tail having a substantially L-shape when viewed from the front. The tail extends downward and rightward from a right end of the intermediate portion. The right electrode film 42 does not have an intermediate portion but has a tail extending rightward from the middle of the head in the vertical direction. A portion of the tail of each electrode film 42 excluding a left end is disposed on the right side of a hard film 38 and extends to a right-hand part of the heating sheet 30. The back side of the portion excluding the left end of the tail of each electrode film 42 is covered with a first film 36.

A PTC layer 44 is disposed in left-hand and right-hand parts on the front side of the hard film 38, and each PTC layer 44 is stretched in substantially vertical direction. The left PTC layer 44 electrically connects the front side of the head of the left electrode film 42 and the front side of a left end of the transparent conductive film 40, and the right PTC layer 44 electrically connects the front side of the head of the right electrode film 42 and the front side of a right end of the transparent conductive film 40.

A second cover hole 46A of the second film 46 is open on the lower side. The second film 46 covers the front side of the first film 36, the hard film 38, the transparent conductive film 40, each electrode film 42, and each PTC layer 44, and a part of the transparent conductive film 40 excluding the upper, left, and right parts of the second cover hole 46A is open on the front side.

Even this embodiment enables functions and effects similar to those of the first embodiment.

Particularly, the separation distances between the heads of the electrode films 42 and the transparent conductive film 40 become longer toward the lower side, and horizontal current-passing distances in the PTC layers 44 between the heads of the electrode films 42 and the transparent conductive film 40 become longer toward the lower side. Accordingly, at the beginning of passage of a current to the PTC layers 44 (supply of a current to the transparent conductive film 40) (when the temperature of the PTC layers 44 is made constant in the entire vertical direction), the resistance of the PTC layers 44 is made larger toward the lower side. For this reason, the current horizontally passing between the heads of the pair of electrode films 42 decreases toward the lower side of the heads of the electrode films 42 and increases toward the upper side of the heads of the electrode films 42, and the current passing through the PTC layers 44 decreases toward the lower side of the PTC layers 44 and increases toward the upper side of the PTC layers 44.

Accordingly, with the lapse of time from the beginning of the passage of a current to the PTC layers 44 (the beginning of the supply of a current to the transparent conductive film 40), a rise in temperature due to the heat generated in the PTC layers 44 is smaller toward the lower side of the PTC layers 44 and is larger toward the upper side of the PTC layers 44, and the resistance increase of the PTC layers 44 is lower toward the lower side of the PTC layers 44 and is higher toward the upper side of the PTC layers 44. With such a configuration, the current passing between the heads of the pair of electrode films 42 is uniformed in the vertical direction, the current supplied to the transparent conductive film 40 is uniformed in the vertical direction, the heating temperature of the transmissive member 26 by the transparent conductive film 40 is uniformed in the vertical direction, and the performance of removing rain, dew, frost, or the like on the front side of the transmissive member 26 by the transparent conductive film 40 is uniformed in the vertical direction.

In this embodiment, the electrode films 42 employ a material similar to that of the transparent conductive film 40. However, the electrode films 42 may include metal.

In the first embodiment and the second embodiment, the pair of electrode films 42 and the transparent conductive film 40 in the heating sheet 30 are electrically connected to each other with the PTC layers 44 interposed therebetween. However, in the heating sheet 30, one electrode film 42 and the transparent conductive film 40 may be electrically connected to each other via a PTC layer 44, and the other electrode film 42 and the transparent conductive film 40 may be electrically connected to each other in a direct manner.

Furthermore, in the first embodiment and the second embodiment, the first film 36, the second film 46, and the hard film 38 (cover) of the heating sheet 30 are films. However, the cover may be formed by coating or potting.

Figure 5B:
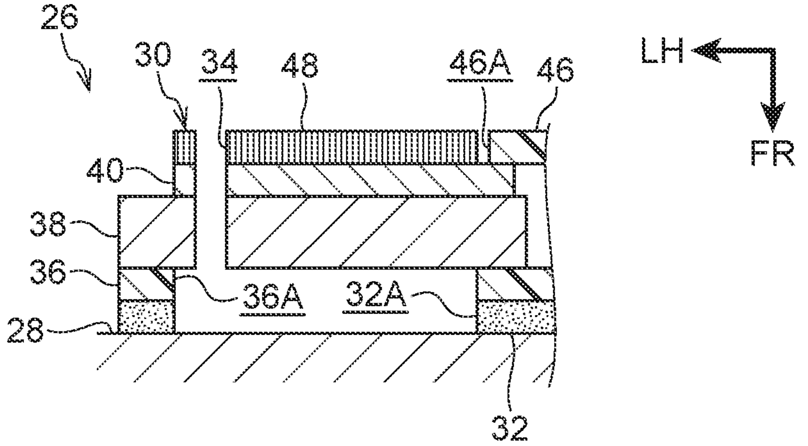
FIG. 5B is a cross-sectional view (cross-sectional view taken along line 5-5 in FIG. 3) of a modification of the heating sheet in the vehicle camera system according to the first embodiment of the invention viewed from below.

In the first embodiment and the second embodiment, the communication hole 34 is formed in the adhesive layer 32 of the heating sheet 30, and the adhesion hole 32A of the adhesive layer 32 and the first cover hole 36A of the first film 36 in the transmissive member 26 communicate with the outside of the transmissive member 26 through the communication hole 34. However, the communication hole 34 may be formed in a part other than the adhesive layer 32 of the heating sheet 30, and the adhesion hole 32A of the adhesive layer 32 and the first cover hole 36A of the first film 36 in the transmissive member 26 may communicate with the outside of the transmissive member 26 through the communication hole 34. For example, the communication hole 34 may be formed in the first film 36, and as illustrated in FIG. 5B, the communication hole 34 may penetrate the hard film 38, the transparent conductive film 40, and the hydrophilic film 48 outside the predetermined area P1.

Still further, in the first embodiment and the second embodiment, the hydrophilic film 48 serves as the suppression unit of the heating sheet 30. However, the suppression unit of the heating sheet 30 may be a water-repellent film including, for example, fluororesin or silicon resin. In this case, the water-repellent film has water repellency and suppresses contamination of the front side of the transparent conductive film 40.

In the first embodiment and the second embodiment, the heating sheet 30 is provided with the first film 36 and the adhesive layer 32. However, the heating sheet 30 may be provided with the adhesive layer 32 without the first film 36.

Still further, in the first embodiment and the second embodiment, the adhesive layer 32 is disposed on the back side of the healing sheet 30 (the back side of the first film 36), and the heating sheet 30 is adhered by the adhesive layer 32. However, the adhesive layer 32 may be disposed on the front side of the heating sheet 30 (the front side of the second film 46), and the heating sheet 30 may be adhered by the adhesive layer 32. In this case, the heating sheet 30 may be provided with the adhesive layer 32 without the second film 46.

In the first embodiment and the second embodiment, the base material of the transmissive member 26 is the glass 28, and the heating sheet 30 is adhered to the glass 28. However, the base material of the transmissive member 26 may be the lens 20A of the camera 20, and the heating sheet 30 may be adhered to the lens 20A.

Still further, in the first embodiment and the second embodiment, the vehicle camera systems 10 and 50 are disposed in a side door of a vehicle. However, the vehicle camera systems 10 and 50 may be disposed in a part other than side doors of a vehicle.

The disclosure of Japanese Patent Application No. 2020-50326 filed on Mar. 19, 2020 is incorporated herein by reference in their entirety.

REFERENCE SIGNS LIST

10 Vehicle camera system
16 Camera mechanism
26 Transmissive member
32 Adhesive layer (cover)
32A Adhesion hole (hollow portion)
34 Communication hole (communication portion)
36 First film (cover)
36A First cover hole (hollow portion)
38 Hard film (cover, restriction unit)
40 Transparent conductive film (heat generator)
42 Electrode film (electrode unit)
44 PTC layer (resistor)
46 Second film (cover)
50 Vehicle camera system
P1 Predetermined area

The invention claimed is:

1. A vehicle camera system comprising:

a camera mechanism provided with a transmissive member that transmits light, the camera mechanism being configured to capture an image of a front side of the transmissive member through a predetermined area of the transmissive member;

a heat generator disposed integrally in an entirety of the predetermined area of the transmissive member, the heat generator transmitting light and the heat generator being configured to generate heat by supply of a current, the camera mechanism being configured to capture the image of the front side of the transmissive member through the heat generator;

a resistor electrically connected to the heat generator; and an electrode unit electrically connected to the resistor, the electrode unit being configured to supply a current to the heat generator through the resistor and the electrode unit not being disposed between the resistor and the predetermined area.

2. The vehicle camera system according to claim 1, wherein the resistor has a resistance that changes according to temperature change of the resistor.

3. The vehicle camera system according to claim 1, wherein the heat generator and the electrode unit have a constant separation distance.

4. The vehicle camera system according to claim 1, wherein the heat generator and the electrode unit have a varying separation distance.

5. The vehicle camera system according to claim 1, further comprising a cover configured to cover at least one of the heat generator, the resistor, or the electrode unit.

6. The vehicle camera system according to claim 5, wherein the cover is disposed in an area other than the predetermined area of the transmissive member.

7. The vehicle camera system according to claim 1, further comprising a communication portion configured to allow a hollow portion in the transmissive member to communicate with an outside of the transmissive member.

8. The vehicle camera system according to claim 1, further comprising a restriction unit configured to restrict deformation of at least one of the heat generator, the resistor, or the electrode unit.

9. The vehicle camera system according to claim 1, wherein the resistor has a resistance that changes according to a change in a current passing through the resistor.

10. The vehicle camera system according to claim 1, wherein a change in resistance at each part of the resistor causes a current change at each position between the heat generator and the electrode unit.

11. A vehicle camera system comprising:

a camera mechanism provided with a transmissive member that transmits light, the camera mechanism being configured to capture an image of a front side of the transmissive member through a predetermined area of the transmissive member;

a heat generator disposed in the predetermined area of the transmissive member, the heat generator being configured to generate heat by supply of a current;

a pair of resistors electrically connected to the heat generator; and a pair of electrode units electrically connected to the pair of resistors respectively, one of the pair of electrode units being configured to supply a current to the heat generator through one of the pair of resistors, another of the pair of electrode units being configured to be supplied the current from the heat generator through another of the pair of resistors, wherein the pair of resistors are disposed opposite to each other with respect to the predetermined area.

* * * * *